United States Patent
Uno

(10) Patent No.: US 8,001,593 B2
(45) Date of Patent: Aug. 16, 2011

(54) AUTHENTICATION METHOD AND UNIT, AND ELECTRONIC APPARATUS HAVING AUTHENTICATION UNIT

(75) Inventor: Takahiko Uno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 991 days.

(21) Appl. No.: 11/412,804

(22) Filed: Apr. 28, 2006

(65) Prior Publication Data

US 2006/0245621 A1 Nov. 2, 2006

(30) Foreign Application Priority Data

Apr. 28, 2005 (JP) ................................ 2005-133226

(51) Int. Cl.
G06F 7/04 (2006.01)
G06F 17/30 (2006.01)
G06F 21/00 (2006.01)
H04L 9/32 (2006.01)

(52) U.S. Cl. ........... 726/20; 726/2; 726/4; 726/5; 726/7; 726/9; 726/17; 726/19; 726/21; 713/168; 713/170; 713/182; 713/183; 713/185; 358/1.15; 358/400

(58) Field of Classification Search .......... 713/168–170, 713/182–186; 358/1.13–1.18, 400, 468, 358/1.15; 726/27–33, 2–10, 16–21
See application file for complete search history.

(56) References Cited

U.S. PATENT DOCUMENTS

| 5,440,371 A * | 8/1995 | Okatani .......................... 399/8 |
| 6,088,450 A * | 7/2000 | Davis et al. .................... 713/182 |
| 2002/0016833 A1 * | 2/2002 | Yajima et al. ................. 709/220 |
| 2004/0076300 A1 * | 4/2004 | Ishidoshiro ................... 380/277 |
| 2005/0105734 A1 * | 5/2005 | Buer et al. .................... 380/270 |
| 2005/0264840 A1 * | 12/2005 | Niitsuma .................... 358/1.14 |

FOREIGN PATENT DOCUMENTS

| JP | 6-124188 | 5/1994 |
| JP | 2000-47534 | 2/2000 |
| JP | 2001-125661 | 5/2001 |
| JP | 2002-157050 | 5/2002 |
| JP | 2003-233596 | 8/2003 |
| JP | 2005-32161 | 2/2005 |
| WO | WO00/48063 | * 8/2000 |

OTHER PUBLICATIONS

Office Action for corresponding Japanese Application No. 2005-133226 dated Jan. 12, 2010.

* cited by examiner

*Primary Examiner* — Thanhnga B Truong
*Assistant Examiner* — Madhuri Herzog
(74) *Attorney, Agent, or Firm* — Harness, Dickey & Pierce, P.L.C.

(57) ABSTRACT

A user authentication method for an electronic apparatus makes a user authentication based on received first user identification information and registered user identification information and sets the electronic apparatus in an authenticated state if the received first user identification information matches the registered user identification information, and controls the authenticated state after the user authentication based on received second user identification, by continuing the authenticated state if the received second user identification information matches the registered user identification information.

11 Claims, 8 Drawing Sheets

AUTHENTICATION METHOD AND UNIT, AND ELECTRONIC APPARATUS HAVING AUTHENTICATION UNIT

BACKGROUND OF THE INVENTION

1. Field of the Invention

The present invention generally relates to authentication methods and units and electronic apparatuses having authentication units, and more particularly to an authentication method and an authentication unit which authenticate users using a non-contact (or contactless or wireless) type medium, such as an IC card and a radio frequency identification (RFID) tag or chip, and to an electronic apparatus, such as an information processing apparatus and an image forming apparatus, having such an authentication unit.

2. Description of the Related Art

Various authentication methods are employed to authenticate (or identify) the user of an apparatus such as an information processing apparatus and an image forming apparatus. The information processing apparatus may be a personal computer or the like. The image forming apparatus may be a printing apparatus, a copying apparatus, a facsimile apparatus, a composite apparatus (or multifunction peripheral) or the like.

For example, a magnetic card may be used for the user authentication by registering the user's ID in the magnetic card. When user authentication is made by contacting and reading the user's ID from the magnetic card in the image forming apparatus.

In addition, a non-contact type IC card may be used for the user authentication. In this case, the user authentication is made when the non-contact type IC card carried by the user is near the image forming apparatus. The user authentication result is maintained and not cancelled as long as the user carrying the non-contact type IC card is near the image forming apparatus to perform a copying operation or the like.

In the case where the non-contact type IC card is used for the user authentication, the user authentication is made when the non-contact type IC card carried by the user is near or passes near the image forming apparatus even if this user does not intend to operate the image forming apparatus. This problem is solved by a method proposed in a Japanese Laid-Open Patent Application No. 2005-32161, for example.

However, in the case of the image forming apparatus that makes the user authentication when the non-contact type IC card is near the image forming apparatus, the IC card must be set near a receiver part of the image forming apparatus while the log-in is made and the user of the non-contact type IC is operating the image forming apparatus, so that the user authentication result is maintained and not cancelled. Hence, the user may forget to remove the non-contact type IC card from the set position near the receiver part of the image forming apparatus after operating the image forming apparatus.

On the other hand, in the case of the image forming apparatus that makes the user authentication when the non-contact type IC card is relatively close to the image forming apparatus (that is, farther away from the "near" position referred above), the IC card does not need to be set near the receiver part of the image forming apparatus while the log-in is made and the user of the non-contact type IC is operating the image forming apparatus, in order to maintain and not cancel the user authentication result. But in this case, the user authentication is made when the user carrying the non-contact type IC is relatively close to the image forming apparatus, even if the user is just passing by and has no intention of operating the image forming apparatus.

Therefore, if the non-contact type IC card must be near the image forming apparatus in order to make the user authentication, the user authentication result will be cancelled when the non-contact type IC card is no longer near the image forming apparatus. On the other hand, if the non-contact type IC card does not need to be near the image forming apparatus and only needs to be relatively close to the image forming apparatus in order to make the user authentication, an unnecessary user authentication is made even when the user carrying the non-contact type IC card moves relatively close to the image forming apparatus without intending to operate the image forming apparatus. In other words, when using the non-contact type IC card for the user authentication in the image forming apparatus, it is difficult to simultaneously prevent the unnecessary (or unwanted) cancellation of the user authentication result and the unnecessary (or unwanted) user authentication.

SUMMARY OF THE INVENTION

Accordingly, it is a general object of the present invention to provide a novel and useful authentication method, authentication unit and electronic apparatus having authentication unit, in which the problems described above are suppressed.

Another and more specific object of the present invention is to provide an authentication method, an authentication unit and an electronic apparatus having the authentication unit, which can simultaneously prevent unnecessary (or unwanted) cancellation of a user authentication result and unnecessary (or unwanted) user authentication.

Still another and more specific object of the present invention is to provide a user authentication method for an electronic apparatus, comprising the steps of (a) making a user authentication based on received first user identification information and registered user identification information, and setting the electronic apparatus in an authenticated state if the received first user identification information matches the registered user identification information; and (b) controlling the authenticated state after the user authentication based on received second user identification, by continuing the authenticated state if the received second user identification information matches the registered user identification information. According to the user authentication method of the present invention, it possible to simultaneously prevent unnecessary (or unwanted) cancellation of the authenticated state and unnecessary (or unwanted) user authentication.

A further object of the present invention is to provide a user authentication unit comprising an authenticating part configured to make a user authentication based on received first user identification information and registered user identification information, and to set an authenticated state if the received first user identification information matches the registered user identification information; and an authentication cancel part configured to control the authenticated state after the user authentication based on received second user identification, by continuing the authenticated state if the received second user identification information matches the registered user identification information. According to the user authentication unit of the present invention, it possible to simultaneously prevent unnecessary (or unwanted) cancellation of the authenticated state and unnecessary (or unwanted) user authentication.

Another object of the present invention is to provide an electronic apparatus comprising a receiver part configured to receive user identification information; an authenticating part configured to make a user authentication based on first user identification information received by the receiver part and registered user identification information, and to set the electronic apparatus in an authenticated state if the received first user identification information matches the registered user identification information; and an authentication cancel part configured to control the authenticated state after the user authentication based on second user identification received by the receiver part, by continuing the authenticated state if the received second user identification information matches the registered user identification information. According to the electronic apparatus of the present invention, it possible to simultaneously prevent unnecessary (or unwanted) cancellation of the authenticated state and unnecessary (or unwanted) user authentication.

Other objects and further features of the present invention will be apparent from the following detailed description when read in conjunction with the accompanying drawings.

DESCRIPTION OF THE PREFERRED EMBODIMENTS

Figure 1:
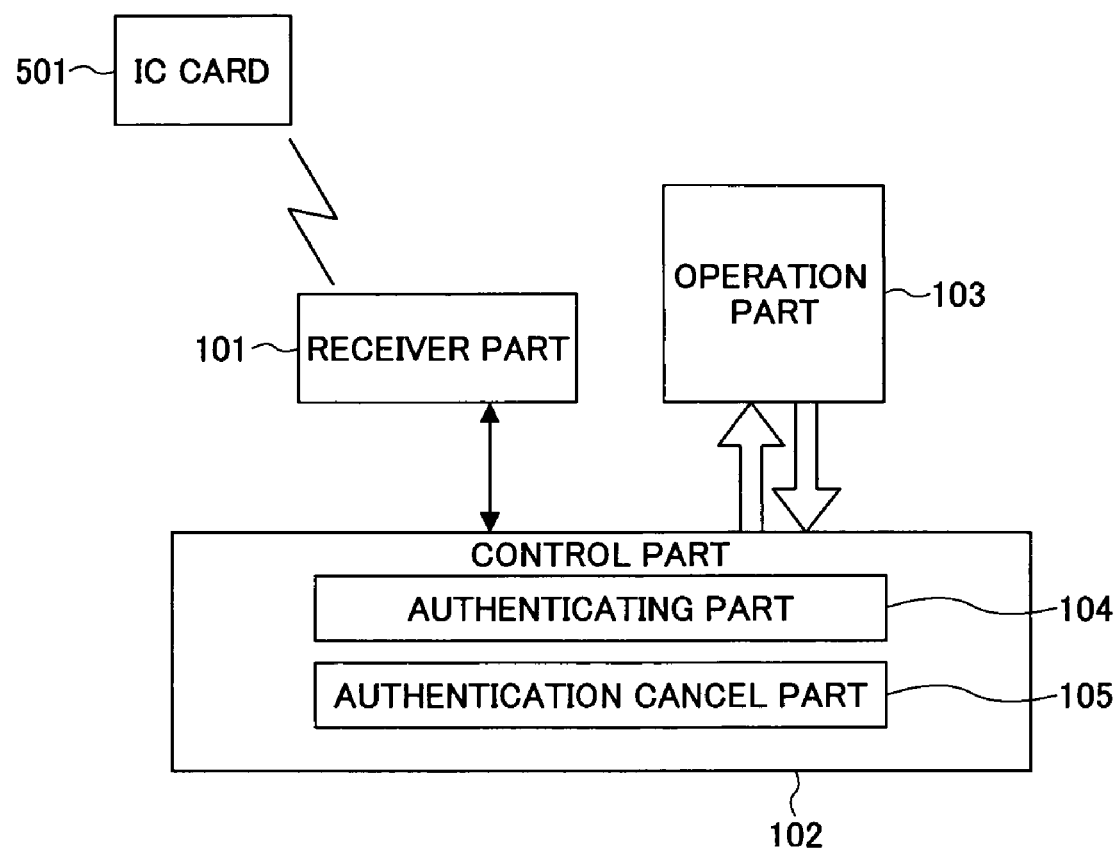
FIG. 1 is a system block diagram showing an embodiment of an electronic apparatus according to the present invention.

A description will be given of an embodiment of an electronic apparatus according to the present invention, by referring to the drawings. This embodiment of the electronic apparatus employs an embodiment of the authentication method according to the present invention and an embodiment of the authentication unit according to the present invention.

The electronic apparatus may be any type of apparatus having the authentication unit, such as an information processing apparatus and an image forming apparatus. The information processing apparatus may be a personal computer or the like. The image forming apparatus may be a printing apparatus, a copying apparatus, a facsimile apparatus, a composite apparatus (or multifunction peripheral) or the like.

FIG. 1 is a system block diagram showing this embodiment of the electronic apparatus according to the present invention. In this embodiment, the present invention is applied to an image forming apparatus 100. The image forming apparatus 100 shown in FIG. 1 includes a receiver part 101, a control part 102 and an operation part 103. The control part 102 includes an authenticating part 104 and an authentication cancel part 105.

The receiver part 101 receives by wireless (or radio) communication user identification information that is stored (that is, registered in advance) in a non-contact (or contactless or wireless) type medium 501, such as an IC card and a radio frequency identification (RFID) tag or chip. The receiver part 101 makes two kinds of receptions, as will be described later. The receiver part 101 makes a first reception to receive the user identification information that is used for a user authentication to log-in to the image forming apparatus 100. The receiver part 101 makes a second reception to receive the user identification information that is used for continuing the operation (or process) of the image forming apparatus 100 after the user authentication.

The control part 102 forms the authentication unit of this embodiment. Of course, the authentication unit may further include the receiver part 101.

Figure 2:
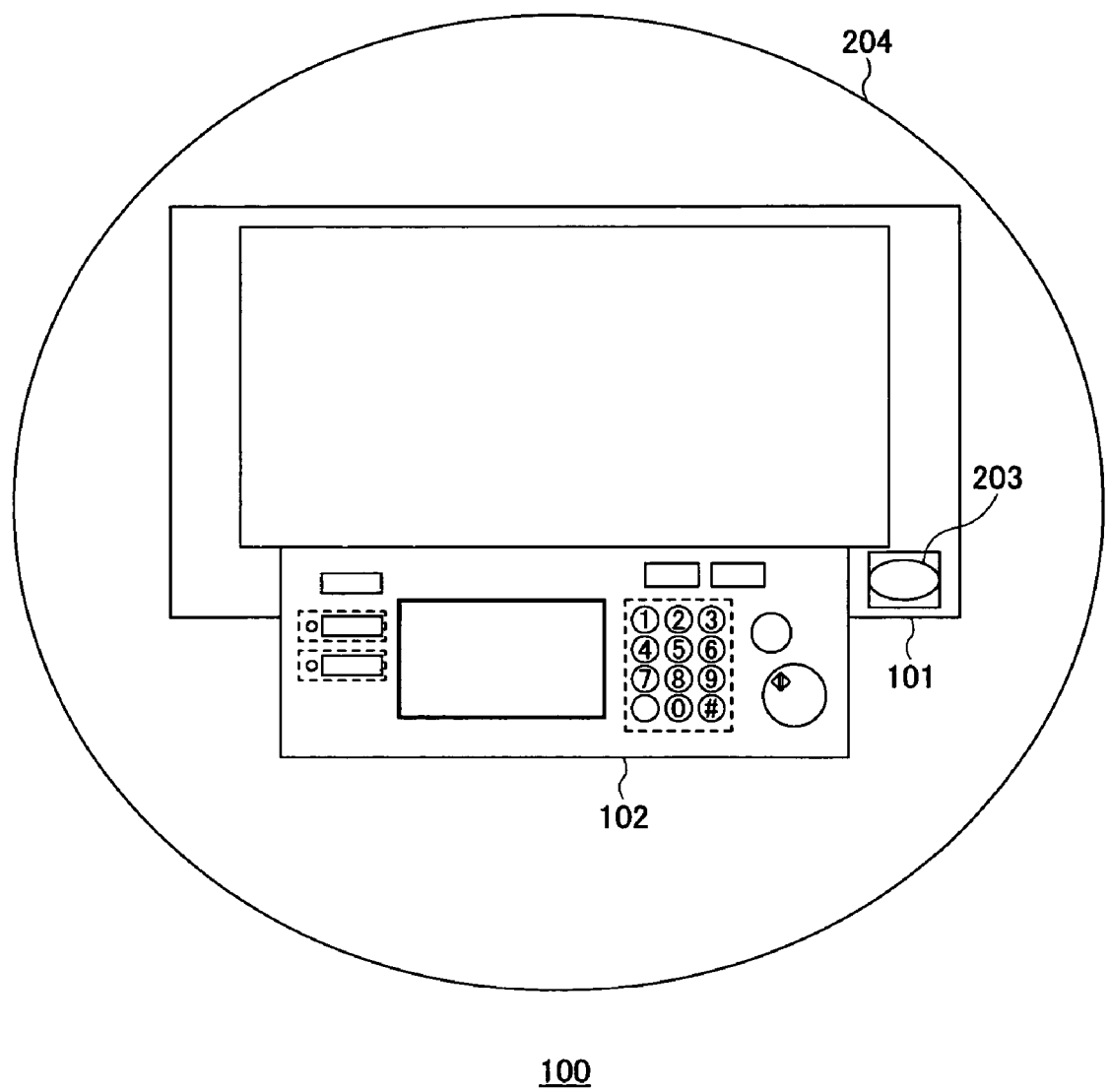
FIG. 2 is a diagram for explaining a receiver part of the electronic apparatus.

FIG. 2 is a diagram for explaining the receiver part 101 of the electronic apparatus, that is, the image forming apparatus 100, to explain the two kinds of receptions. The receiver part 101 can switch its reception sensitivity between two kinds of reception sensitivities, one being higher than the other. For the sake of convenience, the one having the reception sensitivity higher than the other will be referred to as a "high reception sensitivity", and the other will be referred to as a "low reception sensitivity". In FIG. 2, the receiver part 101 can make a satisfactory reception in an area 203 when set to the low reception sensitivity, and can make a satisfactory reception in an area 204 when set to the high reception sensitivity. The area 204 is larger than the area 203, and includes the area 203.

The receiver part 101 is set to the low reception sensitivity capable of making the satisfactory reception in the area 203 when receiving the user identification information that is used for the user authentication to log-in to the image forming apparatus 100. The receiver part 101 is set to the high reception sensitivity capable of making the satisfactory reception in the area 204 when receiving the user identification information that is used for continuing the operation (or process) of the image forming apparatus 100 after the user authentication. Consequently, prior to the user authentication, the target of the user authentication is limited to only the non-contact type IC card 501 (or the user carrying the non-contact type IC card 501) existing within the area 203. In addition, after the user authentication, the user authentication result is maintained and will not be cancelled even if the non-contact type IC card 501 (or the user carrying the non-contact type IC card 501) moves outside the area 203 as long as non-contact type IC card 501 is within the area 204.

The authenticating part 104 of the control part 102 makes the user authentication based on the user identification information received from the non-contact type IC card 501, by comparing the received user identification information and a registered user identification information which is stored and registered within the image forming apparatus. The registered user identification information may be stored and registered within a memory (not shown) within the control part 102 or, within a memory (not shown) connected externally to the control part 102.

After the user authentication made by the authenticating part 104, the authentication cancel part 105 of the control part 102 cancels the user authentication made by the authenticating part 104 if no user identification information is received by the receiving part 101 for a time exceeding a predetermined time.

Figure 3:
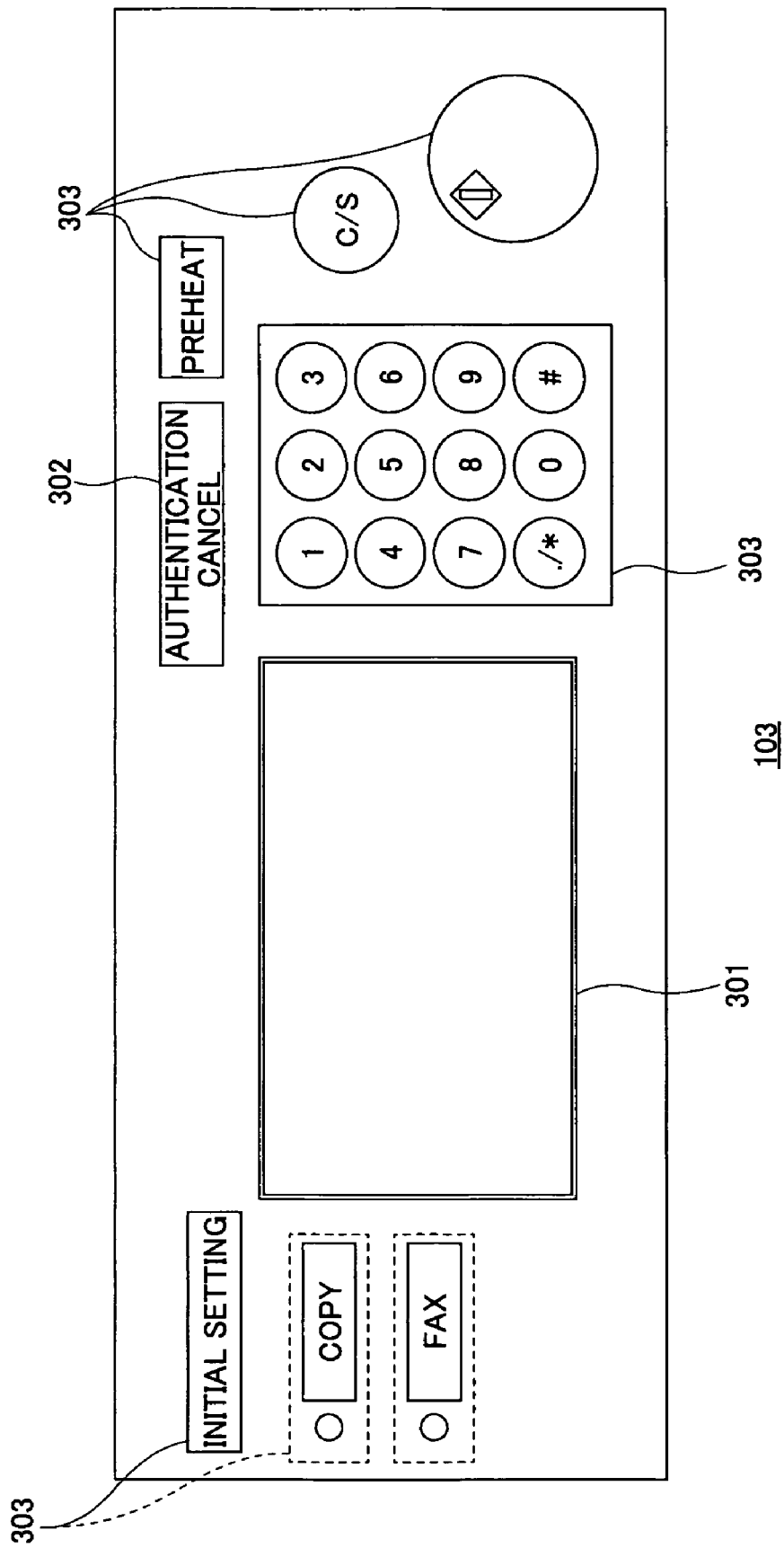
FIG. 3 is a diagram showing a structure of an operation part of the electronic apparatus.

The operation part 103 of the control part 102 includes a display for displaying an operation state of the image forming apparatus 100, and keys for inputting data and instructions. FIG. 3 is a diagram showing a structure of the operation part 103 of the image forming apparatus 100. In FIG. 3, the display is formed by a liquid crystal touch panel 301, for example. The liquid crystal touch panel 301 displays, in addition to the operation state of the image forming apparatus 100, error messages, operation keys that can be pushed (or selected), and the like. In addition, the keys include an authentication cancel key 302 and various function keys 303. The authentication cancel key 302 is pushed (or selected) when cancelling the authentication result, that is, the authenticated state of the image forming apparatus 100. When the authentication cancel key 302 is pushed, the authenticated state of the image forming apparatus 100 is cancelled and the user can no longer operate the image forming apparatus 100.

Figure 4:
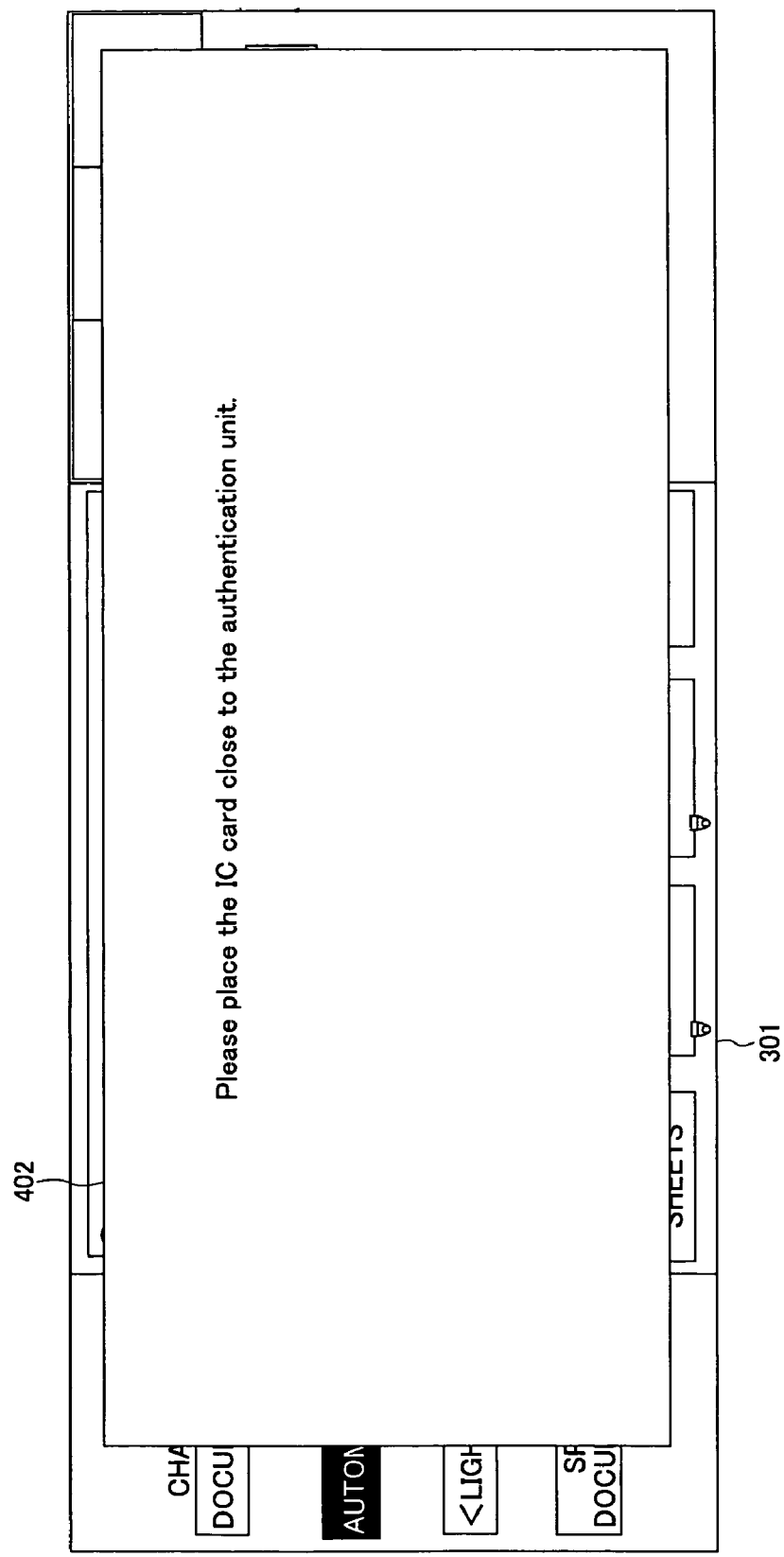
FIG. 4 is a diagram showing a display made on a liquid crystal touch panel prior to a user authentication.

FIG. 4 is a diagram showing a display made on the liquid crystal touch panel 301 prior to the user authentication. Prior to the user authentication, the liquid crystal touch panel 301 displays an authentication request screen 402 requesting the user authentication by a message "Please place the IC card close to the authentication unit.".

In this state, operation keys and the like for actually operating the image forming apparatus 100 are not displayed on the liquid crystal touch panel 401. After the user authentication, this display on the liquid crystal touch panel 301 is switched to a display shown in FIG. 5, for example.

Figure 5:
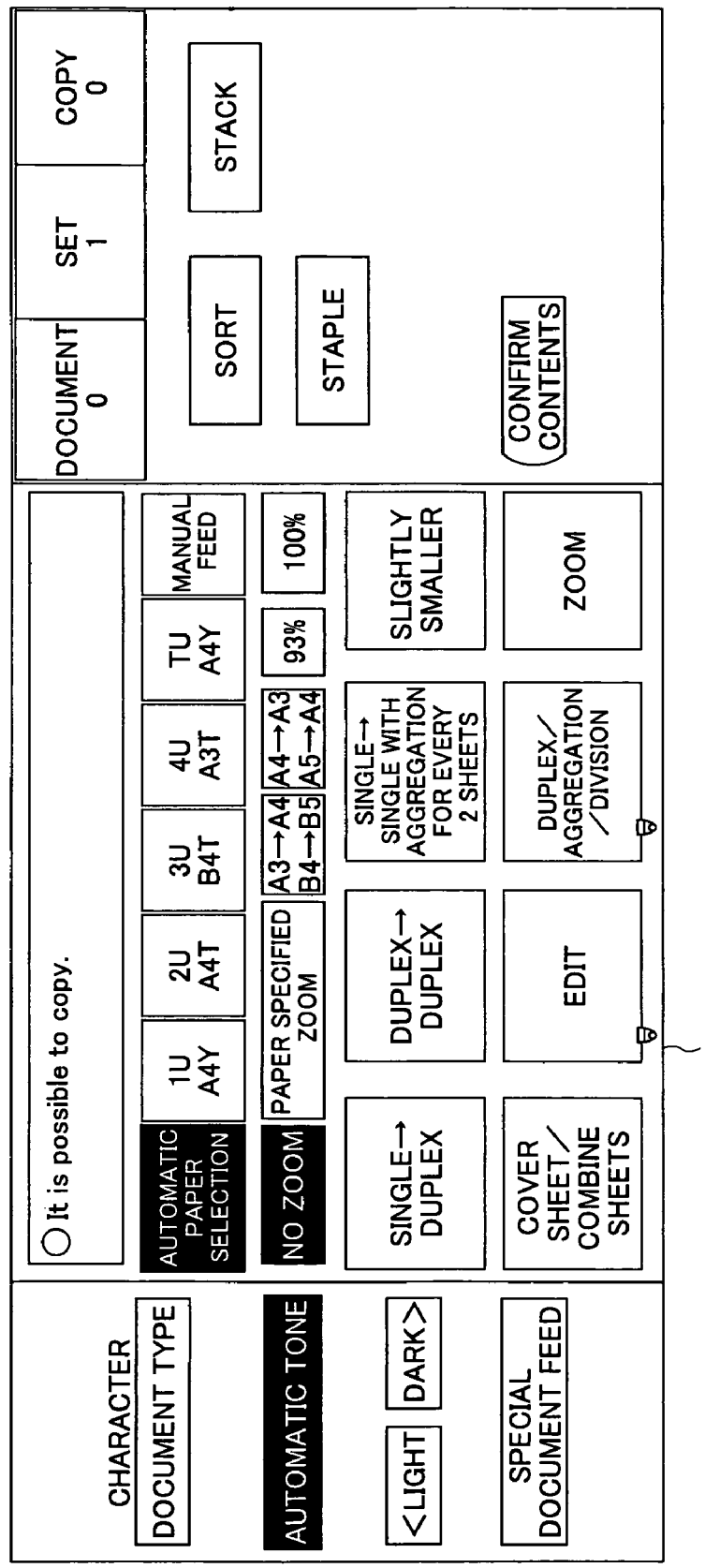
FIG. 5 is a diagram showing a display made on the liquid crystal touch panel after the user authentication.

FIG. 5 is a diagram showing the display made on the liquid crystal touch panel 301 after the user authentication. After the user authentication is made, the operation keys and the like for actually operating the image forming apparatus 100 are displayed on the liquid crystal touch panel 301, as shown in FIG. 5. The user can instruct the operation and/or the details of the operation, such as a copy operation and/or the details of the copy operation, by pushing appropriate operation keys displayed on the liquid crystal touch panel 301.

Figure 6:
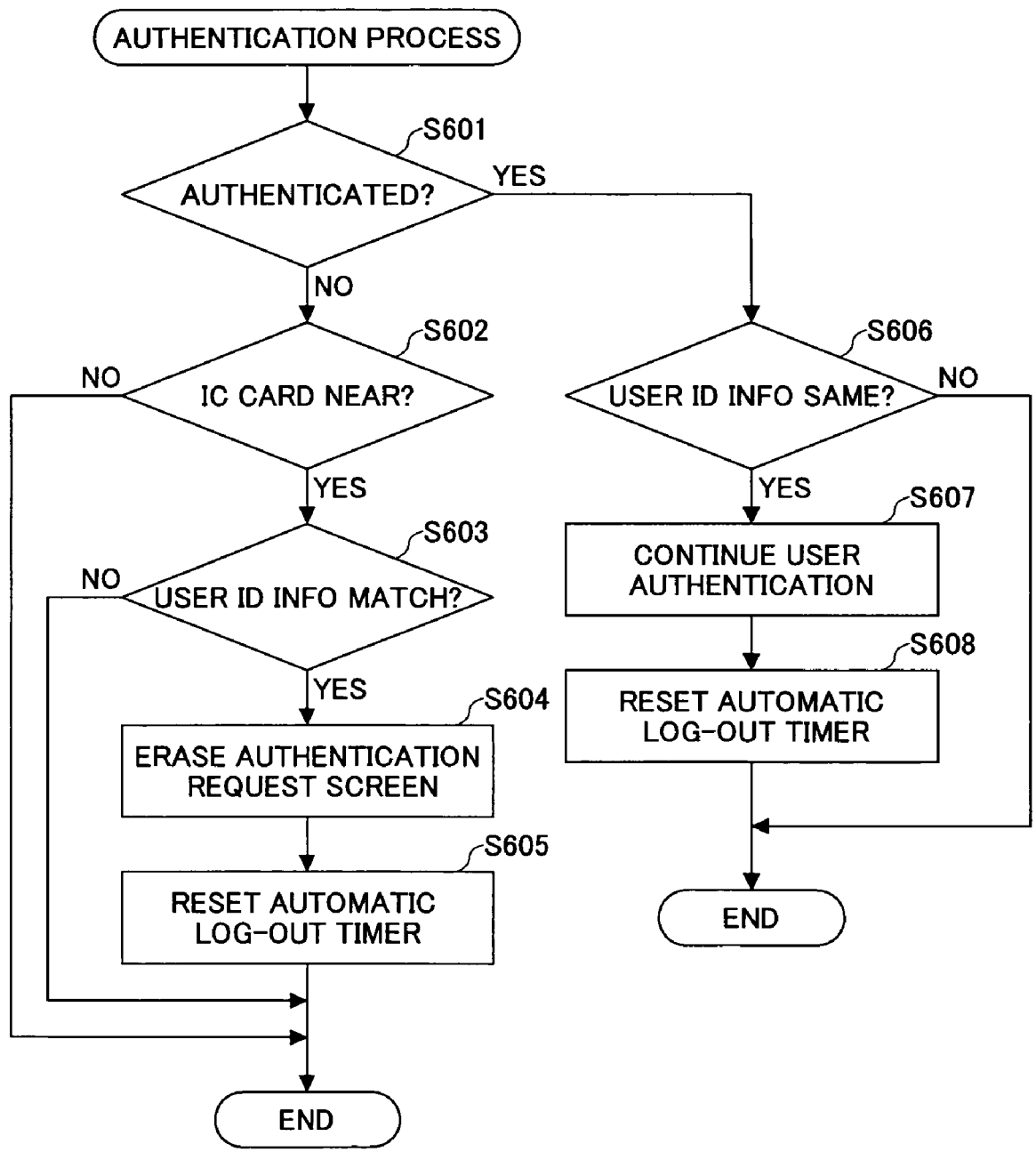
FIG. 6 is a flow chart for explaining an operation of a control part of the embodiment of the electronic apparatus.

FIG. 6 is a flow chart for explaining an operation of the control part 102 of the image forming apparatus 100 in this embodiment. The operation of the control part 102 can be roughly divided into an operation for the case where the user authentication is not yet made, and an operation for the case where the user authentication has been made.

In FIG. 6, a step S601 decides whether or not the user authentication using the non-contact type IC card 501 has been made. If the decision result in the step S601 is NO, a step S602 decides whether or not a user authentication to log-in to the image forming apparatus 100 can be made. Whether or not the user authentication to log-in to the image forming apparatus 100 can be made may be judged based on whether or not the non-contact type IC card 501 is near the receiver part 101 and is located within the area 203.

If the decision result in the step S602 is YES, a step S603 decides whether or not the user identification information received from the non-contact type IC card 501 matches the registered user identification information. The decision in the step S603 is made in the authenticating part 104. If the user identification information received from the non-contact type IC card 501 matches the registered user identification information and the decision result in the step S603 is YES, a step S604 erases (or discontinues the display of) the authentication request screen 402 shown in FIG. 4, and a step S605 resets an automatic log-out timer within the control part 102.

The operation ends after the step S605 or, if the decision result in the step S602 or S603 is NO.

On the other hand, if the user authentication using the non-contact type IC card 501 has been made and the decision result in the step S601 is YES, a step S606 decides whether or not the user identification information received from the non-contact type IC card 501 is the same user identification information with respect to which the user authentication was successful. Whether or not the user identification information received from the non-contact type IC card 501 is the same user identification information with respect to which the user authentication was successful, may be judged based on whether or not the received user identification information is the same as the authenticated user identification information matching the registered user identification information. If the decision result in the step S606 is YES, a step S607 a step S607 continues the user authentication based on the received user identification information, and a step S608 resets the automatic log-out timer of the control part 102.

The operation ends after the step S608 or, if the decision result in the step S606 is NO.

The user can continue to operate the image forming apparatus 100 in the state where the user authentication is continued. Next, a description will be given of a case where the user stops to operate the image forming apparatus 100, that is, makes a log-out, in the state where the user authentication is continued. The log-out may be made manually by the user as shown in FIG. 7 or, automatically as shown in FIG. 8.

Figure 7:
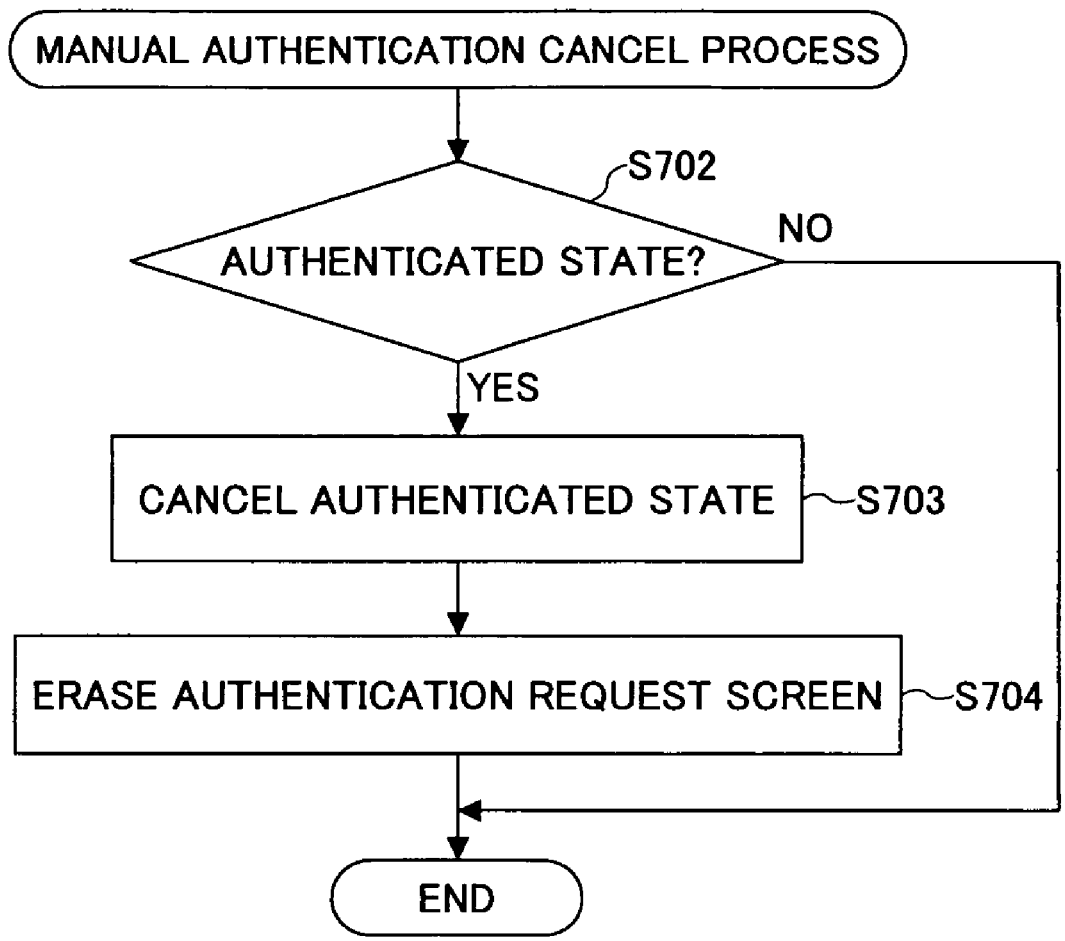
FIG. 7 is a flow chart for explaining a manual authentication cancel operation.

FIG. 7 is a flow chart for explaining a manual authentication cancel operation. In FIG. 7, a step S702 decides whether or not the image forming apparatus 100 is in the authenticated state (or the state where the user authentication is continued). If the decision result in the step S702, the user pushes the authentication cancel key 302 shown in FIG. 3 in a step S703 so as to cancel the authenticated state of the image forming apparatus 100. Then, a step S704 erases (or discontinues the display of) the authentication request screen 402 shown in FIG. 4 in response to an external cancel instruction generated by the pushing of the authentication cancel key 302. The operation ends after the step S704 or if the decision result in the step S702 is NO.

Figure 8:
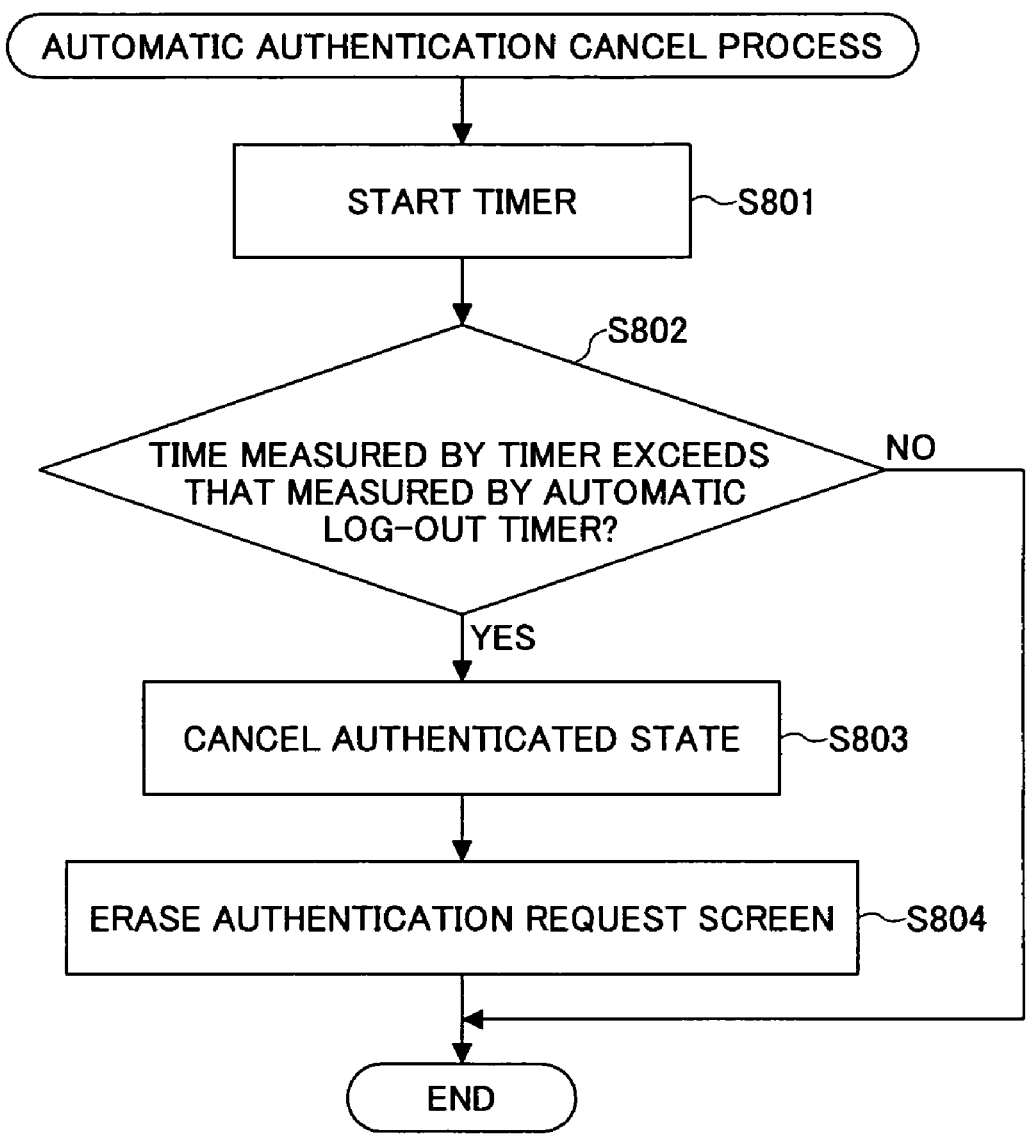
FIG. 8 is a flow chart for explaining an automatic authentication cancel operation.

FIG. 8 is a flow chart for explaining an automatic authentication cancel operation. In FIG. 8, a step S801 starts a timer of the authentication cancel part 105. A step S802 decides whether or not a time measured by the timer of the authentication cancel part 105 exceeds an automatic log-out time that is measured by the automatic log-out timer of the control part 102. If the decision result in the step S802 is YES, a step S803 cancels the authenticated state of the image forming apparatus 100 by the authentication cancel part 105. In addition, a step S804 erases (or discontinues the display of) the authentication request screen 402 shown in FIG. 4. The operation ends after the step S804 or if the decision result in the step S802 is NO. Hence, the authenticated state of the image forming apparatus 100 is automatically cancelled if the user identification information matching the registered user identification information is not received from the non-contact type IC card 501 for a time exceeding the predetermined time.

Therefore, once the user makes a log-in to the image forming apparatus 100 by placing the non-contact type IC card 501 within the area 203, the user can continue to operate the image forming apparatus 100 as long as the non-contact type IC card 501 is within the area 204, without having to set the non-contact type IC card 501 near the receiver part 101. For this reason, the authenticated state of the image forming apparatus 100 may be continued while the user is relatively close to the image forming apparatus 100 and the non-contact type IC card 501 carried by the user is located within the area 204, for example. In other words, it is possible to simultaneously prevent unnecessary (or unwanted) cancellation of the authenticated state and unnecessary (or unwanted) user authentication.

This application claims the benefit of a Japanese Patent Application No. 2005-133226 filed Apr. 28, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. A user authentication method for an electronic apparatus, comprising:

authenticating a user based on received first user identification information and registered user identification information, and setting the electronic apparatus in an authenticated state if the received first user identification information matches the registered user identification information;

controlling the authenticated state after the user authentication based on received second user identification information, by continuing the authenticated state ff the received second user identification information matches the registered user identification information, receiving the first user identification information from a non-contact type medium located within a first area relative to the electronic apparatus when carrying out the authenticating operation; and receiving the second user identification information from the non-contact type medium located within a second area relative to the electronic apparatus when carrying out the controlling operation, wherein the second area is larger than the first area and includes the first area, and wherein a reception sensitivity for receiving the first user identification information is set to a first sensitivity level during the authentication operation, a reception sensitivity for receiving the second user identification information is set to a second sensitivity level during the controlling operation, and the second sensitivity level is higher than the first sensitivity level; and wherein the controlling operation includes canceling the authenticated state in response to an external cancel instruction.

2. The user authentication method as claimed in claim 1, wherein the controlling operation includes canceling the authenticated state if no second user identification information matching the registered user identification information is received for a time exceeding a predetermined time.

3. A user authentication unit comprising:

an authenticating part configured to authenticate a user based on received first user identification information and registered user identification information, and to set an authenticated state if the received first user identification information matches the registered user identification information;

an authentication cancel part configured to control the authenticated state after the user is authenticated based on received second user identification, by continuing the authenticated state if the received second user identification information matches the registered user identification information;

a receiver part configured to receive the first user identification information from a non-contact type medium located within a first area relative to the receiver part with respect to the authenticating part, and to receive the second user identification information from the non-contact type medium located within a second area relative to the receiver part with respect to the authentication cancel part, wherein a reception sensitivity for receiving the first user identification is set to a first sensitivity level during the authentication operation, a reception sensitivity for receiving the second user identification information is set to a second sensitivity level during the controlling operation, and the second sensitivity level is higher than the first sensitivity level, and wherein the second area is larger than the first area and includes the first area and wherein the authentication cancel part cancels the authenticated state in response to an external cancel instruction.

4. The user authentication unit as claimed in claim 3, wherein the authentication cancel part cancels the authenticated state if no second user identification information matching the registered user identification information is received for a time exceeding a predetermined time.

5. An electronic apparatus comprising:

a receiver part configured to receive first and second user identification information;

an authenticating part configured to authenticate a user based on the first user identification information received by the receiver part and registered user identification information, and to set the electronic apparatus in an authenticated state if the received first user identification information matches the registered user identification information; and an authentication cancel part configured to control the authenticated state after the user authentication based on the second user identification received by the receiver part, by continuing the authenticated state if the received second user identification information matches the registered user identification information;

wherein the receiver part is configured such that a reception sensitivity for receiving the first user identification is set to a first sensitivity level before the user is authenticated, a reception sensitivity for receiving the second user identification information is set to a second sensitivity level after the user is authenticated, and the second sensitivity level is higher than the first sensitivity level, wherein said receiver part receives the first user identification information from a non-contact type medium located within a first area relative to the receiver part with respect to the authenticating part, and receives the second user identification information from the non-contact type medium located within a second area relative to the receiver part with respect to the authentication cancel part, and wherein the second area is larger than the first area and includes the first area; and wherein said authentication cancel part cancels the authenticated state in response to an external cancel instruction.

6. The electronic apparatus as claimed in claim 5, wherein said authentication cancel part cancels the authenticated state if no second user identification information matching the registered user identification information is received by the receiver part for a time exceeding a predetermined time.

7. The electronic apparatus as claimed in claim 5, forming an apparatus selected from a group consisting of an information processing apparatus and an image forming apparatus.

8. The electronic apparatus as claimed in claim 7, wherein the image forming apparatus is selected from a group consisting of a printing apparatus, a copying apparatus, a facsimile apparatus, and a composite apparatus.

9. The user authentication method as claimed in claim 1, wherein the controlling operation includes preventing an unwanted cancellation of the authenticated state.

10. The user authentication method as claimed in claim 1, wherein the controlling operation includes preventing a redundant re-authentication.

11. The user authentication method as claimed in claim 1, wherein the authenticating operation includes not displaying an operation key for operating the electronic apparatus.

* * * * *